United States Patent [19]
Friedel

[11] Patent Number: 5,345,964
[45] Date of Patent: Sep. 13, 1994

[54] PIPE PIERCING FITTING AND VALVE

[75] Inventor: Norbert Friedel, Waghäusel, Fed. Rep. of Germany

[73] Assignee: Friatec AG Keramik- und Kunststoffwerke, Mannheim, Fed. Rep. of Germany

[21] Appl. No.: 67,792

[22] Filed: May 27, 1993

[30] Foreign Application Priority Data

May 30, 1992 [DE] Fed. Rep. of Germany ....... 4217982

[51] Int. Cl.5 ................. F16K 43/00; F16K 49/00; F16L 41/06
[52] U.S. Cl. ................... 137/318; 219/535; 219/544; 285/197; 408/67; 408/95
[58] Field of Search ............ 137/318; 83/54; 285/197, 198, 199, 21, 156, 286; 408/67, 83.5, 87, 95, 204; 219/535, 544, 547, 548

[56] References Cited

U.S. PATENT DOCUMENTS

| | | | |
|---|---|---|---|
| 2,839,075 | 6/1958 | Mueller | 137/318 |
| 3,130,483 | 4/1964 | Mueller et al. | 137/318 |
| 3,176,708 | 4/1965 | Shields | 137/318 |
| 3,240,227 | 3/1966 | Burkholder | 137/318 |
| 3,307,435 | 3/1967 | Floren | 137/318 |
| 3,349,792 | 10/1967 | Larkin | 137/318 |
| 3,460,533 | 8/1969 | Leopold, Jr. et al. | 137/318 |
| 3,756,261 | 9/1973 | Minchhoff | 137/318 |
| 3,896,842 | 7/1975 | Cole | 137/318 |
| 4,029,118 | 6/1977 | Merideth | 137/318 |
| 4,063,844 | 12/1977 | Pessia | 137/318 |
| 4,076,038 | 2/1978 | Wynne | 137/318 |
| 4,258,742 | 3/1981 | Louthan et al. | 137/318 |
| 4,515,177 | 5/1985 | Thalmann et al. | 137/318 |
| 4,655,480 | 4/1987 | Thalmann | 137/318 |

FOREIGN PATENT DOCUMENTS

| | | |
|---|---|---|
| 2709466 | 9/1979 | Fed. Rep. of Germany . |
| 3744693 | 12/1988 | Fed. Rep. of Germany . |
| 3830395 | 1/1990 | Fed. Rep. of Germany . |

Primary Examiner—George L. Walton
Attorney, Agent, or Firm—Evenson, McKeown, Edwards & Lenahan

[57] ABSTRACT

A combination pipe piercing fitting and valve including a housing formed of a weldable plastic and having a valve casing communicating with a branch nipple. In the valve casing a valve stem and a boring tool are disposed for axial movement so as first to pierce a pipe welded to the housing and to then selectively open or close the branch nipple from the pipe. A sleeve for guiding the boring tool is axially and rotationally secured in the valve casing and extends at least past the area where the branch nipple enters the valve casing. This guide sleeve has a valve seat at its bottom end and an opening adjacent the branch nipple. This combination fitting and valve assures high operating reliability without leakage both during piercing of the pipe and during operation as a valve.

17 Claims, 1 Drawing Sheet

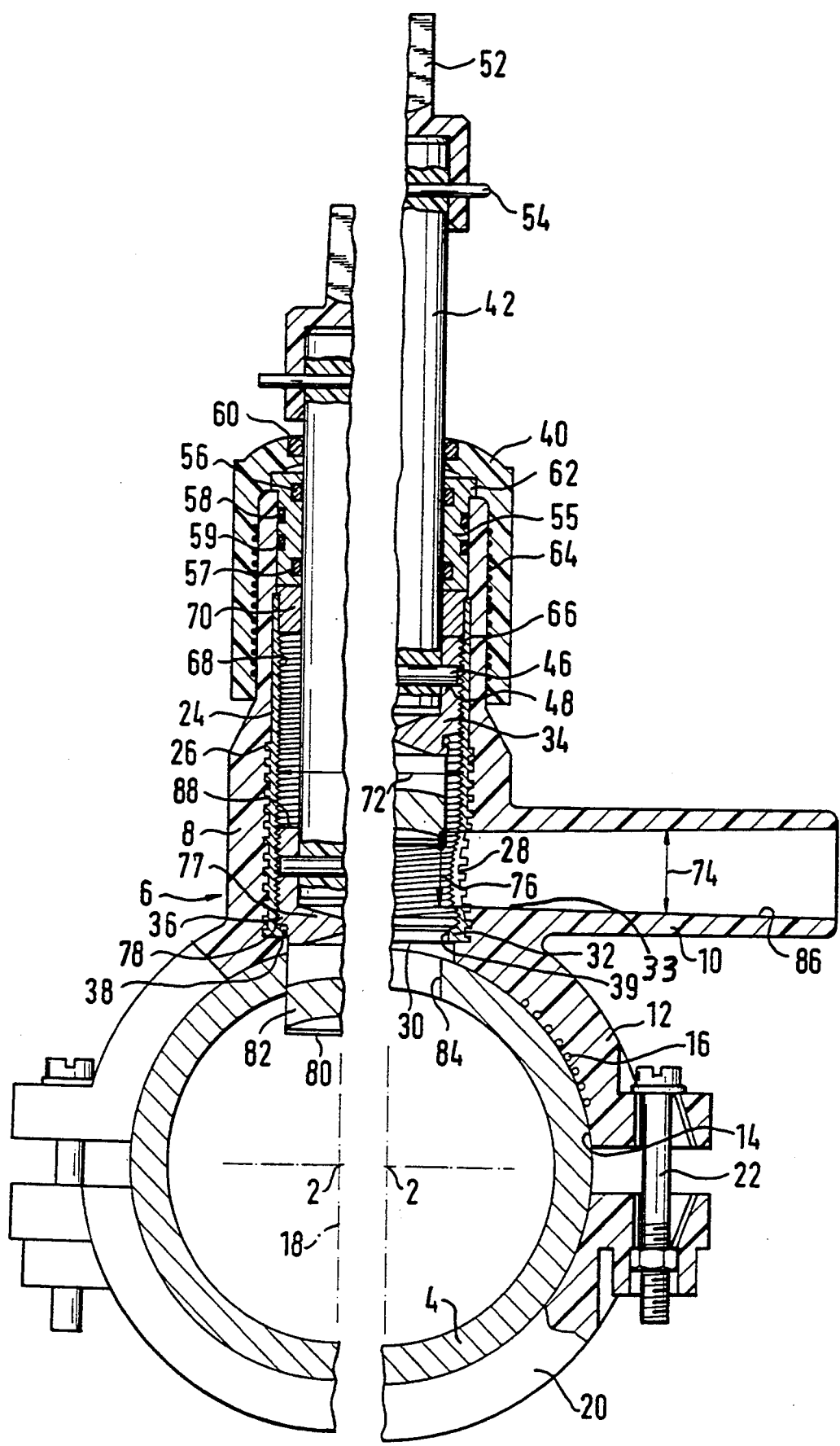

PIPE PIERCING FITTING AND VALVE

BACKGROUND OF THE INVENTION

This invention relates to a pipe piercing fitting and a valve, comprising a housing which can be attached to a pipe, particularly by welding, containing a guide sleeve with a valve stem disposed therein for axial movement, the valve stem carrying a boring tool for piercing the pipe and a valve body for selectively opening or closing a branch connecting nipple communicating with the valve housing.

Published German Patent Application No. DE 2,709,466 discloses a piercing fitting and valve in whose valve casing a nipple is provided for connecting a branch line. The branch can be, for example, a residential connecting line which is connected by the known fitting to a water main. A valve upper part is threaded into the valve casing, and a threaded sleeve and a guide bushing are threaded into the valve upper part so as to be axially displaceable. These two bushings surround the valve stem, and are moved axially with the valve stem toward the pipe when the pipe is pierced and are subsequently fixed axially in the valve upper part by means of a special locking device. The aforementioned component parts are made of metal and contain a number of interengaging threads as well as locking members. This not only results in a correspondingly high manufacturing cost, but also creates a considerable danger of corrosion damage, so that if such valves are placed underground together with underground pipes for an expected long period of use which may be many decades, their operability becomes questionable after only a few years. Between the valve upper part and the valve seat there is a comparatively large free chamber through which the valve stem passes, and from which the branch nipple opens. The valve spindle is guided in the valve upper part, so that overall the valve connection together with the valve upper part and the bushings referred to constitute a considerable length. Due to the comparatively large distance between the valve seat and the valve stem guide sleeve, the valve casing must be made quite stiff in order to prevent damage to the valve seat by the boring tool when the boring is done. Finally, taking into account the large distance between the guide sleeve and the valve seat, a stable configuration must be assured in order to prevent the valve body from lifting off the valve seat and resulting in leakage when external forces act on the valve upper part.

Published German Patent No. DE 3,830,395 discloses a pipe piercing fitting which serves exclusively for piercing a pipe and does not have any valve function. This pipe piercing fitting contains a valve casing into which a branch nipple opens, whereby a cylindrical sleeve is integrated in the casing. The bottom end of the sleeve is positioned in the vicinity of the branch nipple. A boring tool is disposed in the sleeve for axial displacement through a threaded guide. In order to bore into the pipe, a device with a boring spindle is disposed on top of the valve body and is brought into engagement with the boring tool to operate it. After a hole has been bored, the spindle device is removed, and the free end of the casing is closed off with a plug. This pipe piercing fitting cannot readily be used as a valve, inasmuch as neither a valve seat nor a valve head is provided, in order to selectively open or close the flow path between the interior of the pipe and the branch connection.

Further, published German patent application No. DE 3,744,693 discloses a valve piercing clamp comprising a shell with a vertically oriented valve casing integrally formed thereon. This shell is composed, like the pipe, of PVC. The vertical casing contains a stepped bore with a screw thread in which a T-shaped insert of brass is releasably secured. This insert has a lateral branch connection and also, coaxial with the stepped bore, an additional bore at the upper end into which a spindle sleeve can be screwed. A support body for a boring tool is rotatably arranged in an internal thread inside the valve stem sleeve. Also, a spindle extends out the upper end of the spindle sleeve, which when it is rotated moves the boring tool axially via the support body. The valve piercing clamp consists of a number of components, each of which must be sealed against one another, so that a not inconsiderable expense is required for manufacture and assembly. The insert and the spindle sleeve are formed of metal and are thus subject to corrosion, especially when positioned underground, so that there is no assurance of reliable operation of the integrated boring tool and valve over an extended period of service. Finally, this known valve piercing clamp has a substantial height and additional measures are needed in order to prevent damage when the pipe is laid or during subsequent construction operations.

SUMMARY OF THE INVENTION

The object of the invention is to provide an improved combination pipe piercing fitting and valve.

Another object of the invention is to provide a combination pipe piercing fitting and integrated valve which can be manufactured without excessive expense.

A further object of the invention is to provide a combination pipe piercing fitting and integrated valve which exhibits a high operating reliability and a lowered tendency to leak both during piercing of the pipe and operation of the valve.

It is also an object of the invention to provide a combination pipe piercing fitting and integrated valve which is compact and especially has a low height.

Yet another object of the invention is to provide a combination pipe piercing fitting and integrated valve which is easy to operate and virtually eliminates the danger of improper installation and/or errors in operation.

A still further object of the invention is to provide a combined pipe piercing fitting and integrated valve which has a high resistance to corrosion and a long useful life.

An additional object of the invention is to provide a combination pipe piercing fitting and integrated valve which does not require complex installation procedures and which involves a relatively small number of parts.

A particular object of the invention is to provide a combination pipe piercing fitting and integrated valve which assures high reliability of operation and a long service life.

These and other objects of the invention are achieved by providing a combination pipe piercing fitting and valve comprising a housing which can be bonded by welding to a pipe, the housing comprising a valve casing containing a guide sleeve and a valve stem with a boring tool guided in the guide sleeve for axial movement in order to pierce the pipe and selectively open and shut a branch nipple communicating with the valve casing at a junction, wherein the guide sleeve is axially and rotationally secured in the valve casing and extends at least over the junction of the valve casing and the branch nipple, and the guide sleeve has an opening therethrough adjacent the branch nipple and has a bottom end formed as a valve seat between the branch nipple and the pipe.

The proposed combination pipe piercing fitting and valve head is characterized by functional design, and in all operating conditions it assures reliable sealing against leakage of the medium present in the pipe. The end of the guide sleeve facing the saddle advantageously contains the seat for the associated valve head of the boring tool. This integration of the valve seat into the guide sleeve assures reliable sealing even if the housing of the fitting is made of plastic, which, compared to metal, has a greater elasticity and/or tendency toward plastic deformation. In comparison to the pipe piercing fitting initially described above, there is no space between the guide bushing and the valve seat, so that radial misalignment is prevented, reliable closing of the valve head is assured, and high reliability of operation is also provided in a compact device.

The guide sleeve has an opening adjacent the branch connection, through which the medium from the interior of the pipe can flow into the line connected to the branch nipple, after the pipe has been pierced and the valve has been opened. The valve seat is disposed below this opening in such a manner that, when the valve body is in the lower end position, the valve is closed, and consequently no medium can flow out of the pipe into the branch nipple. The guide sleeve is substantially cylindrical and contains an internal thread on the inside surface which is engaged by an external thread on the boring tool. The aforementioned opening into the branch nipple extends through this internal thread of the guide sleeve. The valve seat for the valve body, which is a part of the boring tool, is arranged at the lower end of the guide bushing. At the top of the boring tool there is a recess into which the valve stem extends and is fastened. The boring tool with its integrated valve head is a compact component, preferably formed as a single piece, and in general permits the valve casing to be short.

Other than the boring tool, the important parts are formed of plastic, so that corrosion problems will not interfere with operation even after a long period of time. In particular, it is preferred to form the spindle or stem which is used to turn the boring tool into the attached pipe and to operate the integrated valve, of plastic, as well as the cap through which the spindle or valve stem extends outwardly in a sealed manner. The guide sleeve, which is preferably formed of metal, surrounds and directly guides the boring tool. The guide sleeve is also permanently integrated into the valve casing and is externally entirely surrounded by plastic. The guide sleeve contains radially outwardly extending anchoring ridges which assure reliable positioning in the valve casing, at least axially, and in appropriate cases also circumferentially. To prevent rotation the guide sleeve preferably has a polygonal external contour, especially a hexagonal contour. The guide sleeve contains the internal thread which is engaged by the external thread of the boring tool in order to directly guide the boring tool. The boring tool has a stepped outside contour with the external thread on an upper part. A lower part of the boring tool is provided with a cutting edge or the like, and when the valve is closed, this lower part projects out of the guide sleeve.

To assure safety, there are several sealing zones by means of which any external leaking of the medium is prevented during the piercing, on the one hand, or afterwards when the branch nipple and the branch line connected thereto is open or closed. The boring tool, which is formed of metal, is axially attached to the one-piece plastic spindle or valve stem and secured against rotation relative to the spindle. The cap is advantageously welded to the valve casing at the factory, so that afterward improper operation, which might cause the sealing rings to be lost or the sealing surfaces to be damaged, is prevented. Welding the cap to the valve casing at the factory assures, with minimal production cost and use of material, a functionally effective joint throughout the entire life of the device over many years and decades.

BRIEF DESCRIPTION OF THE DRAWINGS

The invention will be described in further detail hereinafter with reference to an illustrative preferred embodiment shown in the accompanying drawing which is a sectional side elevation of an illustrative combination pipe piercing fitting and integrated valve according to the present invention.

DETAILED DESCRIPTION OF PREFERRED EMBODIMENTS

The drawing shows a sectional view through a combined valve and pipe piercing fitting according to the invention, transversely of the longitudinal axis 2 of a pipe 4 to which it is attached. The combined pipe piercing fitting and valve comprises a housing 6 containing a boring tool 34, which is shown on the left half of the drawing being turned into the pipe 4 and on the right half of the drawing is shown turned back out of the pipe. Housing 6 comprises a valve casing 8 which communicates with a branch nipple 10 to which a branch line can be connected. Facing the pipe 4 the housing 6 has a saddle 12 having an inside face 14 in which a heating coil 16 is disposed. This heating coil 16 is arranged in a known manner concentric to the axis 18 of the valve casing 8. The saddle 12 is joined in a known manner by means of bolts 22 to a bottom clamp 20 on the outside surface of the pipe 4, and a tight joint between the saddle 12 and the pipe 4 is achieved by means of the heating coil 16.

A guide sleeve 24, which has radially raised anchoring ridges 26 on its exterior, is integrated into the valve casing 8. The guide sleeve 24 may desirably be formed of metal, especially brass. As seen in cross section, the outside surface of the guide sleeve 24 is in the shape of a polygon, especially a hexagon, thereby securing the guide sleeve in an advantageous manner against rotation in the valve casing 8. The anchoring ridges 26 are formed by making radial cuts or by turning down the outer surfaces of the guide sleeve 24 which is formed, for example, as a hexagon. The anchoring ridges 26 are advantageously configured as rings or the like which project radially from the outside surface of the guide sleeve and are surrounded by the plastic when the body 6 is injection molded, and thus securely embedded therein. Due to the annular anchoring ridges 26 and the plastic present between them, a good seal is assured so that the medium cannot creep along between the outside surface of the guide sleeve 24 and the plastic of the valve casing 8 and escape.

The guide sleeve 24 extends over a substantial portion of the overall height of the valve casing 8. The guide sleeve 24 has an opening 28 adjacent the branch nipple 10, and the bottom end 30 of the guide sleeve extends into the saddle 12, close to the outside surface of the pipe 4. At that point, furthermore, a valve seat 32 is integrated into the guide sleeve 24. The valve seat 32 is below the bottom edge 33 of the branch nipple 10.

As can be seen on the left side of the drawing, the boring tool 34 with its integrated valve body 36 lies in sealing contact with valve seat 32. Further, the boring tool 34 contains a sealing ring 36 in an annular groove, particularly at the radially inner end of the valve body 36. This sealing ring 38 is matched to the diameter of a, preferably cylindrical, sealing surface 39 at the bottom end 30 of the guide sleeve or to the valve seat 32. This valve construction and arrangement of parts generally assures an extremely low leakage rate. The valve seat 32 is at the bottom end 30 of the guide sleeve 24 which is of substantially cylindrical configuration. Only the valve seat 32 has a smaller diameter than the rest of the inside surface of the guide sleeve.

The end of valve casing 8 remote from the longitudinal axis 2 is closed by a cap 40 through which a valve stem 42 extends. The cap 40 is permanently joined in liquid-tight manner to the outside surface of the valve casing 8. Preferably the junction is welded in order to permanently prevent moisture from the exterior, e.g., from the surrounding earth, from entering the valve casing and causing corrosion damage therein. Inside the valve casing 8, the boring tool 34, which is formed of metal, is connected by a pin 46 to the adjacent end of the valve stem 42. This pin 46 extends through a transverse bore in the stem 42, which is formed of plastic, and both of its ends engage in radial bores 48 in the boring tool 34. Because the valve stem is made of plastic, the kinds of corrosion problems do not occur which are normally to be expected when metal valve stems are exposed to moisture after being buried in the ground. Even after years the valve stems can be turned without difficulty in order to shut off the branch line. At its free outside end the stem 42 is fastened to a square boss 52 by means of a pin 54. As can be seen, the square boss serves in a known manner as a point of attachment for a tool for actuating the valve stem. The connection between the plastic stem 42 and the square boss 52 by means of the pin 54 is designed to be a break-away connection, so that in case of improper actuation, the pin 54 will break, the square boss will come away from the stem, and thus the device disposed with the pipe 4 in the ground will not be damaged. The device is corrosion-free since the housing 6 as well as the cap 40 and the stem 42 are made of plastic. Aside from the guide sleeve 24 and the boring tool 34, which are formed of metal, the principal parts of the device according to the invention are formed of plastic to assure long life even if it is exposed to attacking or corrosive influences.

To seal the axially displaceable stem 42, the stem is surrounded by an annular body 55 which is inserted into the top of the valve casing 8 where it is held by the cap 40. The annular body 55 contains a sealing ring 56, 57 in at least one annular groove, which lies, as shown, in sealing contact with the cylindrical exterior of the stem 42. To seal it with respect to the valve casing 8, the outside surface of the annular body 55 includes at least one gasket, and preferably two gaskets 58, 59. Also, on the outside of the cap 40 there is a wiper ring or doctor 60, first to prevent foreign bodies or dirt from penetrating into the area of the sealing surfaces of the sealing rings 56, 57, and second to provide a supplemental sealing function. As shown, the cap 40 extends over the valve casing 8 and a flange 62 of the annular body 55, which is thus locked axially in place. All told, the design of the invention makes it possible to accommodate the sealing ring or rings 56 to 59 and the cap 40 in an especially advantageous manner in a valve casing of short overall length, and on the other hand a sufficiently large external surface of the valve casing 8 is provided for welding it to the cap. The cap 40 has on its inside surface a welding coil 64 in order to create a lasting and leak-proof joint at the factory after the assembly of the stem 42 and boring tool 34.

The boring tool or punch 34, which is formed of metal, serves on the one hand to bore into the pipe 4 and on the other hand as a valve body for blocking off the branch nipple 10 from the pipe 4. The boring tool 34, which is fixed both axially and rotationally to the stem 42, has an external thread 66 which turns in the internal thread 68 of the guide sleeve 24 when the stem 42 is rotated, and is movable in the direction of the axis 18. The guide sleeve 24 with the internal thread 68 extends over a substantial part of the total height of the valve casing 8 in which it is integrated as described above. By comparing the left half of the drawing with the right half, it can be seen that despite the short overall length of the valve casing 8 and cap 40, the boring tool can move through a relatively long distance when the valve stem 42 is rotated. A ring 70 is inserted into the upper end of the guide sleeve 24, which ring advantageously also is made of metal and serves primarily as an upper stop for the metal boring tool 34. The ring 70 is preferably joined reliably and firmly to the guide sleeve 24 by an external thread which is screwed into the internal thread 68. This preferred embodiment prevents damage when the boring tool 34 is turned out and the valve opened. This is true particularly in regard to the joint between the cap 40 the valve casing 8, since practically no force is applied to this joint because of this ring.

The internal thread 68 of the guide sleeve 24 extends upward from the valve seat 32, preferably over the entire length of the guide sleeve 24. It should be especially noted that the opening 28 adjacent the branch nipple 10 extends through the internal thread 68. In accordance with the invention, the inside diameter 72 of the guide sleeve 24 is substantially greater than the inside diameter 74 of the branch nipple 10 and/or than the inside diameter 76 of the opening 28. In this manner reliable guidance of the boring tool 34 is assured even if its external thread 66 is moved to the level of the branch nipple 10, i.e. in the area of the opening 28. The guide sleeve 24 and/or the internal thread 68 have the same inside diameter 72 over virtually the entire axial length, and they are formed with a smaller diameter only at the bottom end due to the valve seat 32 provided there.

At the bottom 77 of the boring tool 34, there is an outer step with a preferably conical sealing surface 78 which, as shown in the left half of the drawing, rests in sealing contact with the corresponding valve seat 32 of the guide sleeve 24. Advantageously, the sealing ring 38 is provided in an annular groove in the boring tool 34 and/or its bottom 77. Alternatively, a comparable sealing ring could be arranged in the valve seat 32, in which case the outside diameter of the boring tool 34 at its bottom 77 and the contact surface provided there for the sealing ring will be slightly larger than the outside diameter of the cutting edge 80 provided on the front end of the boring tool 34. The boring tool 4 has a stepped external contour; the upper part provided with the external thread 66 having a greater outside diameter than the bottom part containing the cutting edge 80. In accordance with the invention, there is a sealing surface 78 in the transition between the upper part with the external thread 66 and the bottom part. The valve seat 36 extends radially inward in a corresponding manner from the inside surface of the guide sleeve 24 provided with the thread 68 such that the bottom part of the boring tool can be moved past the radially inner surface, which preferably is configured as the sealing surface 39. The integration of the valve seat 32 and its adaptation to the stepped external contour of the boring tool 34 entails only a minimal manufacturing cost, yet in this way it is possible in an especially advantageous manner to assure high operational reliability of the seal with a negligible leakage rate.

Between the cutting edge 80 and the continuous bottom 77 of boring tool 34, there is a hollow space in which, after the boring of the pipe 4, the cut out piece 82 is tightly held so that it is not entrained by the medium flowing through the pipe 4. For the valve function of the boring tool 34, a total of three successive, independent sealing zones, can be distinguished. First, there is a direct sealing of the boring tool 34 in the bore 84 of the pipe 4. The second sealing zone is found between the sealing ring 38 and the associated sealing surface 39 at the bottom of the guide sleeve 24. A third sealing zone is created by the tight contact between the preferably conical sealing surface 78 of the boring tool 34 with the likewise conically sloping valve seat 32. The contact pressure in this third sealing zone is produced by tightening the valve stem.

The raised position of the boring tool 34 and valve stem 42 is shown in the right half of the drawing. The position of the upper end of the valve stem 42 and the square boss or the like there provided, gives a direct indication as to whether the valve is open or closed. The axial length of movement of the boring tool, described above, is predetermined in such a way that after turning to the fully open position, the cutting edge is out of the path of the flow of the medium flowing from the pipe 4 into the branch line. This specific dimensional relationship can be seen directly in the right half of the drawing, in accordance with which the cutting edge 80 is situated above the upper inside edge 86 of the branch nipple 10. In this position three independent and successive sealing zones can again be distinguished. First, a seal is produced by the sealing ring or rings 56, 57 against the outer surface of the valve stem. Furthermore, the upper end face 88 of the boring tool 34 is tightly pressed against the axial face of the ring 70. Finally, the wiper ring or doctor 60, which is primarily intended to prevent entry of dirt, serves a sealing function.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything embraced within the scope of the appended claims and equivalents thereof.

What is claimed is:

1. A combination pipe piercing fitting and valve comprising a housing which can be bonded by welding to a pipe, said housing comprising a valve casing containing a guide sleeve and a valve stem with a boring tool guided in said guide sleeve for axial movement in order to pierce said pipe and selectively open and shut a branch nipple communicating with the valve casing at a junction, wherein said guide sleeve is axially and rotationally secured in said valve casing and extends at least over the junction of said valve casing and said branch nipple, and said guide sleeve has an opening therethrough adjacent said branch nipple for communication between said pipe and said branch nipple after said pipe has been bored, and said guide sleeve has a bottom end formed as a valve seat for said boring tool between said branch nipple and said pipe, said opening being selectively opened and shut by axial movement of said boring tool along said guide sleeve.

2. A combination pipe piercing fitting and valve according to claim 1, wherein said guide sleeve has an internal screw thread, and said boring tool has an external screw thread which engages the internal screw thread of said guide sleeve.

3. A combination pipe piercing fitting and valve according to claim 2, wherein said internal thread of said guide sleeve extends from said valve seat past said branch nipple.

4. A combination pipe piercing fitting and valve according to claim 2, wherein said opening in said guide sleeve extends through said internal thread.

5. A combination pipe piercing fitting and valve according to claim 1, wherein said guide sleeve has an internal screw thread extending along substantially the entire length of the guide sleeve.

6. A combination pipe piercing fitting and valve according to claim 1, wherein said guide sleeve is formed of metal.

7. A combination pipe piercing fitting and valve according to claim 1, wherein radially projecting annular anchoring ridges are provided exteriorly on said guide sleeve.

8. A combination pipe piercing fitting and valve according to claim 1, wherein said guide sleeve is integrated into a thermoplastic valve housing during manufacture of the housing by injection molding the thermoplastic of the housing surrounding the guide sleeve.

9. A combination pipe piercing fitting and valve according to claim 1, wherein said housing is formed with a saddle portion for joining said housing to the pipe, and said valve seat on said guide sleeve is disposed within said saddle portion.

10. A combination pipe piercing fitting and valve according to claim 1, wherein at least a portion of said guide sleeve has a polygonal outer cross-sectional configuration.

11. A combination pipe piercing fitting and valve according to claim 1, wherein an annular groove is formed on one of said boring tool and said valve seat, and a sealing ring is disposed in said groove for contacting an associated annular sealing surface on the other of said boring tool and said valve seat.

12. A combination pipe piercing fitting and valve according to claim 1, wherein a cap is fused to a top end of said valve chamber to form a liquid-tight joint, and said valve stem extends through said cap and is axially movable and rotatable relative to said cap.

13. A combination pipe piercing fitting and valve according to claim 12, wherein said cap is provided with a welding coil adjacent an inner surface thereof for fusing said cap to an adjacent outer surface of said valve casing.

14. A combination pipe piercing fitting and valve according to claim 1, further comprising an annular body arranged at an upper end of said valve casing surrounding said valve stem, said annular body carrying at least one sealing ring for sealing said annular body against an outer surface of said valve stem or against an inside surface of said valve casing.

15. A combination pipe piercing fitting and valve according to claim 1, wherein said valve stem is made of plastic and carries a square boss for engaging a tool for turning said valve stem, said valve stem being connected to said square boss by a pin which breaks when a torque exceeding a predetermined maximum limit is applied to said stem by said boss.

16. A combination pipe piercing fitting and valve according to claim 1, wherein said boring tool has a stepped external contour with a larger diameter portion which carries said external screw thread and a smaller diameter portion which carries a cutting edge for piercing said pipe. and a sealing surface is provided in a transition region between said larger diameter portion and said smaller diameter portion.

17. A combination pipe piercing fitting and valve according to claim 16, wherein said sealing surface is a conical surface.

* * * * *